Nov. 3, 1970  G. M. BURGWALD ET AL  3,538,452
LASER SWITCHING DEVICE

Filed April 12, 1965  2 Sheets-Sheet 1

INVENTORS
GLENN M. BURGWALD
NORMAN A. PEPPERS
BY Townsend and Townsend
ATTORNEYS

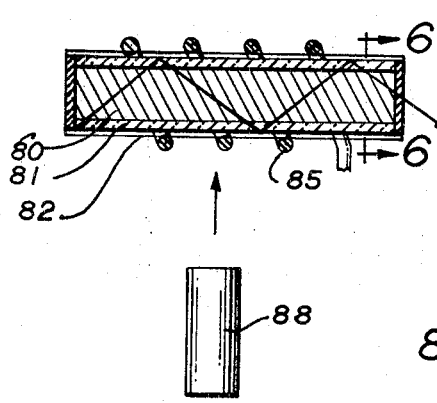
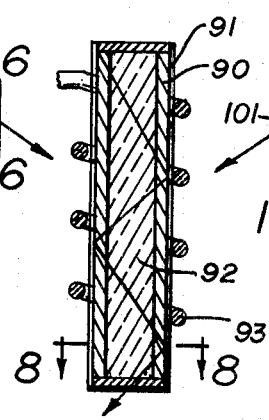
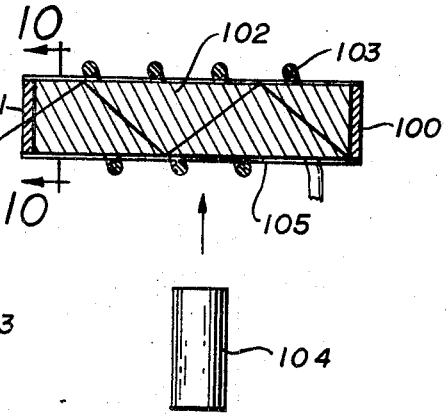
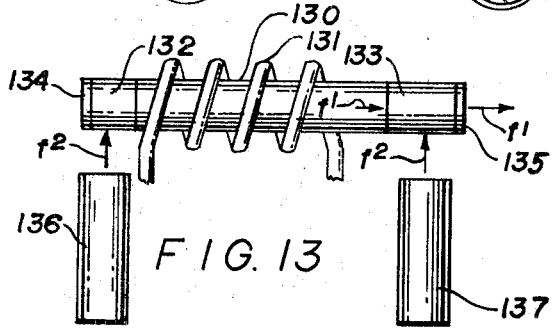
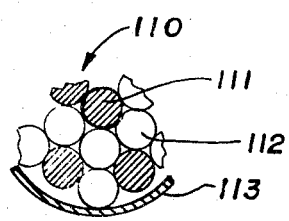
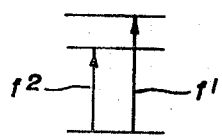
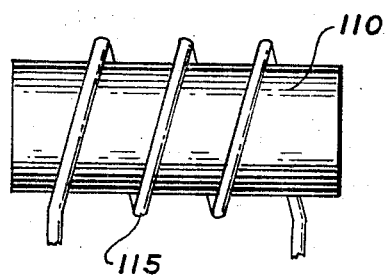

United States Patent Office 3,538,452
Patented Nov. 3, 1970

3,538,452
LASER SWITCHING DEVICE
Glenn M. Burgwald, Mountain View, and Norman A. Peppers, San Carlos, Calif., assignors to Optics Technology, Inc., Palo Alto, Calif.
Filed Apr. 12, 1965, Ser. No. 447,454
Int. Cl. H01s 3/10
U.S. Cl. 331—94.5                    5 Claims

ABSTRACT OF THE DISCLOSURE

A variety of laser switching devices for producing laser pulses and for use in optical computer circuits. A light-absorbing material is combined with the lasing medium in the laser cavity, the light-absorbing material having a light-absorbing first condition operative to substantially inhibit lasing action in the lasing medium and a light transmissive substantially non-absorbing second condition passive to lasing action in the lasing medium. The light-absorbing material is adapted to change to the second condition when energized by light of a predetermined intensity level. The invention is applied to fiber optics.

---

This invention relates to optical switching systems.

In Q-switched lasers as have been conventionally employed in the art a laser element is pumped with an energy source to cause light of a particular wave length to be generated within the laser material. Some means are therein provided to reflect the light within the laser element in a form of optical feed-back system. In order to effect Q-switching an interrupter or shutter mechanism of one form or another is placed within the resonant cavity which normally interrupts a portion of the reflected light within the laser. The shutter then opens at a time interval during which the laser is pumped above the energy level at which the laser would normally lase. Under such conditions it has been found that the laser will provide an extremely high intensity pulse wherein the normal mode of operation, i.e. without the interrupter or shutter, the laser would normally produce a sequence of relatively small pulses.

The present invention is concerned with a novel shutter system for use with such Q-switched laser elements in which the shuter or interrupter is arranged to be actuated by light energy such as would be obtained by a companion laser. It is a further object of this invention to provide a shutter mechanism by which the Q-switching in a laser can be operated by a companion laser beam of either the same or a different wave length as the switched laser.

A further object of this invention is to provide a Q-switched laser system in which the shutter or control mechanism is formed in association with laser fibers so that the trigger or control laser beam as well as the actuating laser beam can be incorporated in the diminutive limitations of fiber optics.

A further object of this invention is to provide a Q-switched laser system particularly adaptable to computer applications in which the Q-switching can function in a variety of gate modes, thus allowing optical switching or gating in conventional "AND," "OR" and "NOR" logic functions.

A further object of the present invention is to provide an optical energy actuated Q-switching arrangement which is integrated within the structure of fiber optics, whereby the internal structure of elements within or integrally associated with the fibers functions to create both the laser and switching operations.

A feature and advantage of this invention lies in the fact that extremely small switchable laser elements can be formed.

A further object of the invention is to provide a laser switching system which is capable of fast switching operations.

Another object of this invention is to provide a Q-switching system in which the output pulse of light is operable to actuate the switch of a subsequent gate which in turn provides an output pulse of lased light capable of operating a still further similar gate, thus allowing the Q-switching elements of the invention to be cascaded in an infinite matrix of a combined gating network to work within complex logic systems. A feature and advantage of the invention lies in the fact that the same type of light signal derived from the output is operable to actuate a subsequent gating system, thus eliminating the necessity for converting one type of signal to another as employed in some optical computer elements.

A further object of the invention is to provide a laser system controlled by Q-switching which is adaptable to construction in a wide variety of physical configurations, whereby spatial and structural elements can be formed to conform with geometrical limitations which may exist in the practical construction of a total system.

Other objects, features and advantages of the present invention will be more apparent after referring to the following specification and attached drawings in which:

FIG. 5 is a sectional view of a lasing fiber in which the shutter is formed as a sheath about a lasing fiber.

FIG. 6 is a cross-sectional view of FIG. 5 taken at line 6—6.

FIG. 7 is a view of a lasing element which is formed in a hollow configuration and having the shutter material formed internally of the hollow lasing element.

FIG. 8 is a cross-sectional view of FIG. 7 taken at line 8—8.

FIG. 9 is a sectional view showing a fiber lasing element having a material which will allow the fiber to function as both the laser and a shutter mixed within the body of the fiber.

FIG. 10 is a cross-sectional view of FIG. 9 taken at line 10—10.

FIG. 11 is an elevation showing a laser comprised of a plurality of fibers in which selected fibers are formed of a shutter operating construction and other fibers are lasing type fibers.

FIG. 12 is a fragmentary enlarged cross-sectional view of FIG. 11.

FIG. 13 is a diagrammatic view of a laser system having a normally passive shutter.

FIG. 13a is a diagram showing the energy level characteristics of the shutter of FIG. 13.

FIG. 13b is an energy level diagram applicable to the operation of the device of FIG. 13.

Figure 1:
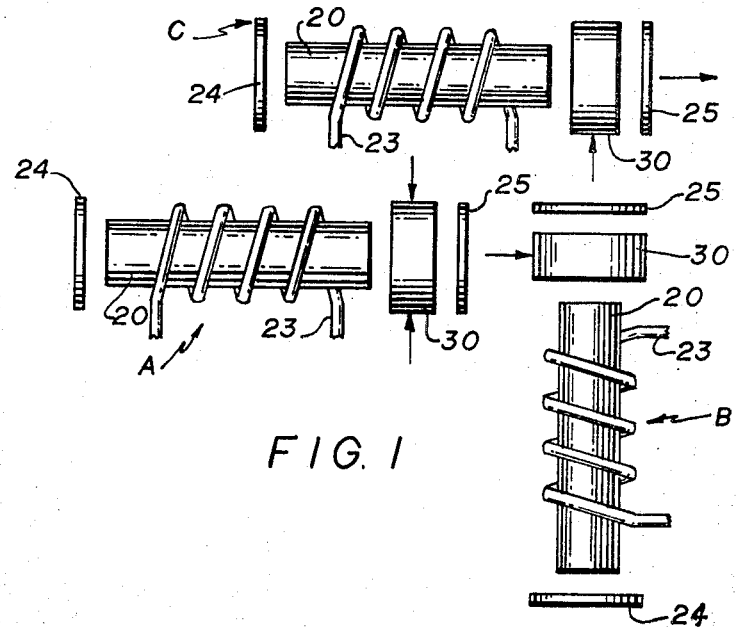
FIG. 1 is a diagrammatic view showing a cascading of basic lasers in which each has an inhibiting shutter mounted within the cavity in which the shutter is light actuated from companion lasers within the cascaded system to create a function analogous to "or" gates.

In FIG. 1 there is provided a laser unit A having a lasing element 20 formed of material conventionally used in lasing operations such as, for example, a ruby rod. A pump 23 is arranged to surround the lasing element and is energized to provide high intensity optical energy of sufficient intensity to cause the lasing element 20 to lase. A mirror 24 is disposed at one end of rod 20, and a mirror 25 is disposed at the opposite end. The two mirrors define a cavity in which the laser 20 is located. Light from the laser element 20 is then reflected from the mirrors back into the lasing element to cause a build-up of light intensity in a general feed-back system. A shutter 30 is interposed between mirror 25 and laser element 20. Shutter 30 is formed of a material which has the characteristic, in a certain condition, of being absorptive of light of the frequency of light emission from the laser element such as, for example, in the case of a ruby laser where the wave length would be 6943 A. In such case shutter 30 can be formed of such material as vanadium phthalocyanine. The aforesaid material has the further characteristic of being bleached to substantially reduce the light absorption when the material is excited by light of sufficient intensity. This is theorized to occur because of the material having an energy diagram wherein the majority of atoms of material are at ground state, and in such condition the material has the optical characteristics of being absorptive of energy of selected frequency range. When the atoms are supplied with sufficient light intensity to raise a substantial number of them to a predetermined energy level, the medium becomes substantially transparent to light in the selected frequency range. It can be readily seen that the medium is relatively absorptive of light in one condition and is bleached to pass the light in a second condition, the second condition being determined by the intensity of light at preselected frequencies entering into the medium. The material selected for shutter 30 is selected to be normally absorptive of light of the lasing wave length of the laser element 20 and which will become substantially transparent to light of the laser wave length when the intensity of the bleaching light reaches a predetermined level. Such shutters have been employed previously in lasers and have been made to function by pumping sufficient light into the laser so that the laser light causes the shutter to become transparent. Before the shutter becomes transparent, the optical feed-back in the cavity is low so that the threshold for lasing in this condition is high. When the shutter becomes transparent, the optical feed-back in the cavity, which is caused by the reflection of light between mirrors 24 and 25, is high and thus the threshold for lasing is lowered. Consequently, when the shutter is opened, a single high intensity pulse is emitted.

Laser unit A is arranged to direct the beam of light to gate an adjoining laser unit B into a lasing condition. Laser unit B in turn is arranged, as shown in FIG. 1, to gate on an adjoining laser unit C. It can be seen that laser units A, B, and C are arranged in cascaded fashion wherein they can be triggered in sequential fashion. Laser units B and C are formed of identical structure to laser unit A having laser elements 20, pumps 23, and mirrors 24 and 25. Each of the laser units B and C is also provided with the light-actuated shutters 30 which function in a manner identical to laser unit A. In the cascaded function, for example, laser unit B is pumped to a point wherein its laser unit 20 would lase were it not for the absorption introduced by shutter 30, the light intensity of laser B being of insufficient intensity itself to cause bleaching of the shutter. However, when laser unit A is caused to lase, the beam from laser unit A is of sufficient intensity to cause bleaching of the shutter 30 of laser unit B, therein causing laser unit B to lase and bleach the shutter 30 of laser unit C to cause lasing action within laser unit C.

Figure 2:
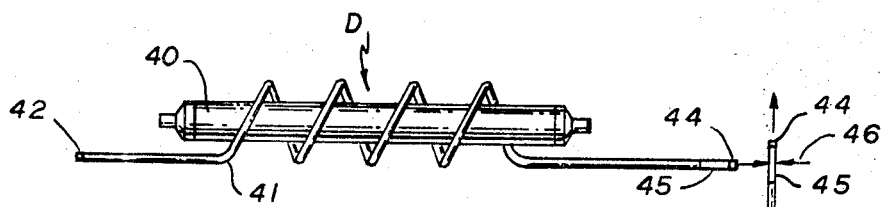
FIG. 2 shows an optical "or" gate formed of lasing fibers in which a shutter is formed integral of the fiber.

In FIG. 2 there is provided an embodiment of the invention in which there are shown, for purposes of illustration, two laser elements D and E in which laser unit D is arranged to trigger laser unit E in a manner similar to that discussed in relation to FIG. 1. Laser units D and E are both formed with centrally aligned pumps 40 in which lasing fibers 41 are wound about pump 40. Reflectors 42 are formed at one end of the fibers 41. The opposite ends of the fibers are formed with reflecting elements 44 having interposed between the element 44 and the end of the fiber shutters 45 which are arranged to operate in the same manner as discussed in relation to shutters 30 in FIG. 1. Shutters 45, however, are formed integrally of fibers 41 so that the diminutive size structures of the fibers are adhered to even within the shutter area. It can be seen that the fibers can be formed to interlase structurally at various angles with respect to the placements of the laser elements, in this case D and E. It is also noted that laser unit E can be alternatively activated by an additional laser element, not shown, but in which the input would come from a direction as indicated by arrow 46 in FIG. 2. By this combination, laser E would be brought into lasing action when bleached at point 46, either by an additional laser or by laser element D as indicated. This type of structure, as can be readily seen, can function in an "or" mode wherein either of the control lasers could function to bleach the shutter element 45 of laser E.

Figure 3:
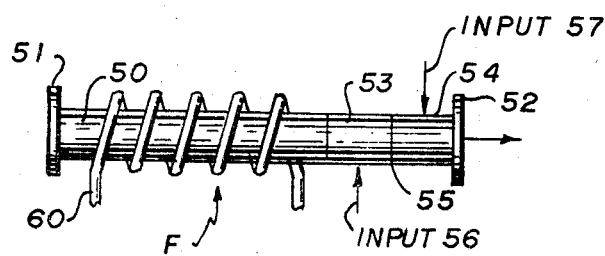
FIG. 3 is a diagrammatic view of a laser element having a pair of shutters adapted to create an "and" type logic function.

In FIG. 3 a laser unit F is arranged to function in an "and" gate mode. Laser unit F comprises a lasing element 50 having the cavity formed by two reflecting elements 51 and 52. Two shutters 53 and 54 are interposed between the lasing element 50 and the mirror 52. The light absorption of either of the two shutters 53 and 54 will absorb sufficient light under normal conditions to prevent oscillation within laser element 50. The two shutters 53 and 54 are formed of such material as vanadium phthalocyanine. There are therein provided two input stations 56 and 57 in which input 56 is arranged to bleach shutter 53 only and input 57 is arranged to bleach shutter 54 only. The two inputs 56 and 57 can be lasers similar to those described in relation to FIGS. 1 and 2, or may be other sources of high intensity light of the required frequency.

In operation, pump 60, arranged in a helix around laser element 50, is energized to bring laser element 50 up to a condition well above its normal threshold in the absence of 53 and 54 but below that level in which oscillation can occur while either of the two shutters 53 and 54 are in the unbleached condition. Thereafter, a high intensity light input to either input stations 56 or 57 will be ineffective to cause oscillation within the cavity of laser F. However, simultaneous high intensity light input via inputs 56 and 57 will cause the simultaneous bleaching of shutters 53 and 54 and hence the immediate oscillation and lasing action of laser unit F. This function is obviously useful in "and" gate logic applications.

Figure 4:
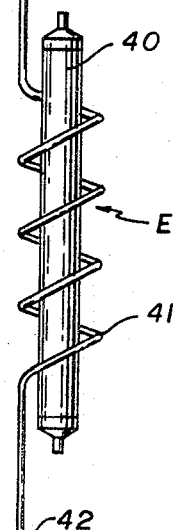
FIG. 4 is a view of a laser having a pair of shutters operable to create a "nor" gate function.
Figure 4:
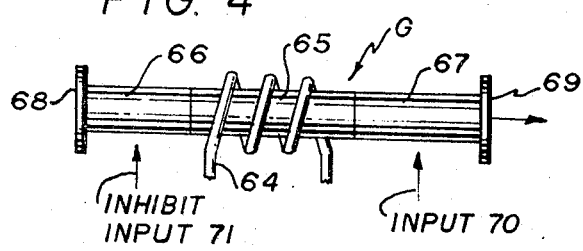

In FIG. 4 there is provided a laser G adapted to function in a "nor" gate mode. Laser element G comprises a lasing element 65 energized by a pump 64. On opposite ends of the lasing element 65 there are provided shutters 66 and 67. On opposite ends of the shutters are provided the reflective elements 68 and 69 which define the cavity. Shutter 67 is formed in a manner similar to the shutters previously discussed in which input such as at 70 is arranged to bleach the shutter. However, shutter 66 is formed of a material which is normally transparent but which is rendered absorptive upon impingement of high intensity light into the shutter from a position as indicated at 71. It can be seen in this device that input at 70 and not at 71 will cause laser G to go into a lasing mode with pump 64 being energized to bring the laser element 65 to a point above threshold for a transparent shutter 67 and below the threshold for an absorptive shutter 67. On the contrary, it can be seen that when high intensity light is applied at input 71, shutter 66 will be absorptive and thus inhibit lasing action, thus rendering any input at input 70 ineffective. It can be seen that this structure therefore is useful in "nor" gate applications.

In reference to the various gate functions achievable as discussed in FIGS. 1 through 4 it is noted that the shutter configuration has been defined as being in line or axially aligned with the laser element. However, other geometries of shutter placement with respect to the lasing element are operable to obtain the same type of Q-switching and logic functions.

In FIGS. 5 and 6 a laser element 80 is sheathed in a cladding of bleachable material 81 which in turn is sheathed by a reflecting material 82. The entire element is pumped by a conventional pump 85 in order to bring the lasing element 80 above its threshold for transparent 81. Q-switching is then accomplished by providing a high-intensity light from laser source 88 onto the exterior of the lasing element to cause the bleaching of the bleachable shutter 81. When this occurs there exists total internal reflection of light within the tube in which the side walls from the reflected surface 82 form the equivalent cavity. Thus, in the embodiment of FIGS. 5 and 6 the internal reflection within the laser cavity is inhibited by the normal absorption of cladding 81. Thus, light from source 88 causes the bleaching of the cladding and thereby allows total internal reflection to occur and the consequent lasing of lasing element 80. In the embodiment of FIGS. 7 and 8 a hollow lasing element 90 is employed having a reflecting outer face 91. Internally of the lasing element is provided a bleachable shutter 92. Conventional pump 93 is arranged around the entire element. It can be seen likewise in the embodiment of FIGS. 7 and 8 that triggering light incident on the laser of FIGS. 7 and 8 will cause the core material at 92 to be bleached to allow internal reflection and consequent lasing oscillation.

In FIG. 9 there is provided still another modification of structural elements useful in acquiring the Q-switching functions. In FIGS. 9 and 10 there is provided an active laser element having internally mixed within the element a bleachable material which in unbleached condition performs sufficient absorptive functions to prevent light reflection between the two reflective end pieces 100 and 101 mounted on the opposite ends of the body 102. Body 102 is sufficiently impregnated with material which is normally light absorptive and which will bleach to a substantially higher degree of light transmission when subjected to intense triggering light. The body 102 is pumped above that threshold that would exist in the absence of the absorber by a pump 103 surrounding the body. Light from a source 104 comprising normally a laser beam when incident on the body 102 bleaches out the internally intermixed bleachable material permitting the laser action.

In FIGS. 11 and 12 there is provided another embodiment of the invention in which a lasing body 110 is formed, as practically seen in FIG. 12, of a matrix of intermixed fibers 111 which are formed of lasing material and fibers 112 which are formed of bleachable material, and the matrix is surrounded by a reflective cladding 113. As in the device of FIG. 9 the various lasing fibers 111 are arranged to pass light between each other in an oscillating mode in order to acquire the energy level necessary to lase when activated by pump 115. Absorbing fibers 112, however, block the energy within the bundle until such time as the bundle is energized by external high energy light.

In the previous embodiments discussed, normally the gate controlling laser is arranged to operate at the same wave length as the operational laser. However, by proper selection of materials it is possible to use gating lasers of different frequency or wave length to accomplish further variations of logic and frequency conversions. As seen in FIG. 13 there is provided a lasing material 130 with a pump schematically illustrated as 131, shutters 132 and 133 at opposite ends of the lasing material, reflective faces 134 and 135 in structural relationship as previously described, and other light sources such as lasers 136 and 137 for operating the shutters 132 and 133, respectively. Assuming, for example, that the lasing material 130 is designed to produce light at $f^1 = 1.06$ microns, a shutter material for shutter 132 may have an energy level diagram as shown in FIG. 13a. As illustrated by the energy level diagram, in absence of light from source 136 such as $f^2 = 6943$ A. The shutter 132 exists in a state which is non-absorptive of $f^1$ since the majority of the atoms in the material in shutter 132 exist in the ground state. When light $f^2$ is supplied from the source 136, atoms are pumped into an excited state at which light $f^1$ is absorbed. This structure serves as an inhibitor, and when the shutter 133 and light source 137 operate in the fashion as the structures previously described with reference to FIGS. 1 and 2, the entire apparatus will serve as a "nor" gate.

As the shutter 133 a material having an energy level diagram as shown in FIG. 13b can be employed in which the material can be excited into a bleached state by light of different frequencies such as light $f^1 = 1.06$ microns and/or $f^2 = 6943$ A. Selection of a material of this type for the shutter 133 allows the device to serve as a frequency converter. For this function 132 and 136 are not necessary. This structure is particularly useful in systems in which light at one frequency is used through a portion of the logic system and wherein it is desired to change the frequency in the system directly.

It can be seen in the present invention that lasers via their structure and intercoupling can accomplish cascaded multiple logic and conversion functions. It can further be seen that the respective lasers are operated at a level at which the laser is prohibited from going into oscillation, due to the basic light intensity within the lasing material which is transmitted to the shutter, which is below the level required to bleach the shutter, thus maintaining the laser below the oscillation level. In this system, therefore, a companion gating laser is therein utilized to bleach the shutter to a sufficient level to allow the controlled laser to immediately go into oscillation upon receipt of the gating pulse. It is important to note that once the switching has occurred, the light intensity passing through the shutter is retained at a sufficiently high level so that the oscillations will be self-sustaining even tough the gating signal is removed. It is also important to note that the shutters should be selected from materials having a rapid recovery rate.

While several embodiments of the present invention have been shown and described it will be obvious that other adaptations and modifications may be made without departing from the true spirit and scope of the invention.

What is claimed is:

1. A laser switching device comprising: a lasing medium formed with a hollow core; reflecting means formed around said lasing medium to form a resonant optical cavity; optical pumping means to cause said lasing element to lase in an oscillating condition within said cavity; light-absorbing material mounted within the hollow core of the lasing medium, said material having a light-absorbing first condition operative to substantially inhibit lasing action in the lasing medium and a light passing substantially non-absorbing second condition passive to lasing action in the lasing medium, said light-absorbing material adapted to change to the second condition when energized by light of a predetermined intensity level; said optical pumping means adapted to produce a light output from said lasing medium less than said predetermined intensity level when the light-absorbing material is in the light-absorbing first condition; and means to supply light intensity to said light-absorbing material at least at said predetermined level.

2. A laser switching device comprising: a fiber optics bundle, said bundle comprising a first plurality of optical fibers formed of a lasing material and a second plurality of optical fibers formed of a light-absorbing material, said light-absorbing material having a light-absorbing state which substantially inhibits lasing action in the lasing material of the first plurality of optical fibers, and a substantially light transmissive state which is passive to laser action in the lasing material of the first plurality of optical fibers; optical cladding surrounding at least a portion of said bundle to provide internal reflection of light within the bundle; and optical pumping means associated with said fiber optics bundle to produce said lasing action in the first plurality of optical fibers when the light-absorbing material of the second plurality of optical fibers is in the light transmissive state.

3. A laser switching device as set forth in claim 2 wherein said first and second pluralities of optical fibers are intermixed.

4. A laser switching device comprising: a fiber optics bundle, said bundle comprising a first plurality of optical fibers formed of a lasing material and a second plurality of optical fibers formed of a light-absorbing material, said light-absorbing material having a light-absorbing first state which substantially inhibits lasing action in the lasing material of the first plurality of optical fibers, and a substantially light transmissive second state which is passive to laser action in the lasing material of the first plurality of optical fibers, said second plurality of optical fibers adapted to change to the second state when energized by light of a predetermined intensity level; optical cladding surrounding at least a portion of said bundle to provide internal reflection of light within the bundle; and optical pumping means associated with said fiber optics bundle to produce lasing action in the first plurality of optical fibers, said optical pumping means adapted to produce a light output from said lasing material less than said predetermined intensity level when the light-absorbing material is in the light-absorbing first state; and means to supply light intensity to said light-absorbing material at least at said predetermined intensity level to change said light-absorbing material to said second state.

5. A laser switching device as set forth in claim 4, wherein said first and second pluralities of fibers are intermixed.

References Cited

UNITED STATES PATENTS

| 3,270,291 | 8/1966 | Kosonocky | 331—94.5 |
| 3,311,845 | 3/1967 | Koester | 331—94.5 |

WILLIAM L. SIKES, Primary Examiner

U.S. Cl. X.R.

350—160